No. 769,066. PATENTED AUG. 30, 1904.
B. A. DUNKLE.
HARNESS.
APPLICATION FILED OCT. 30, 1903.
NO MODEL.

Witnesses
Lindsay de B. Little
Edwin Johnson

Inventor
Blake A. Dunkle

No. 769,066. Patented August 30, 1904.

UNITED STATES PATENT OFFICE.

BLAKE A. DUNKLE, OF EAST PITTSBURG, PENNSYLVANIA.

HARNESS.

SPECIFICATION forming part of Letters Patent No. 769,066, dated August 30, 1904.

Application filed October 30, 1903. Serial No. 179,174. (No model.)

*To all whom it may concern:*

Be it known that I, BLAKE A. DUNKLE, a citizen of the United States, residing at East Pittsburg, in the county of Allegheny and State of Pennsylvania, have invented certain new and useful Improvements in Harness, of which the following is a specification, reference being had therein to the accompanying drawings.

The object of this invention is to provide a harness or hitching-gear having a permanent mounting on the vehicle-shafts and operative in such manner that the horse may be quickly and conveniently hitched and unhitched, the only portion of the harness that is applied in the usual manner being the bridle.

The invention consists in the novel structural features and combination and arrangement of parts hereinafter fully described and claimed, and illustrated by the accompanying drawings, wherein—

Figure 1:
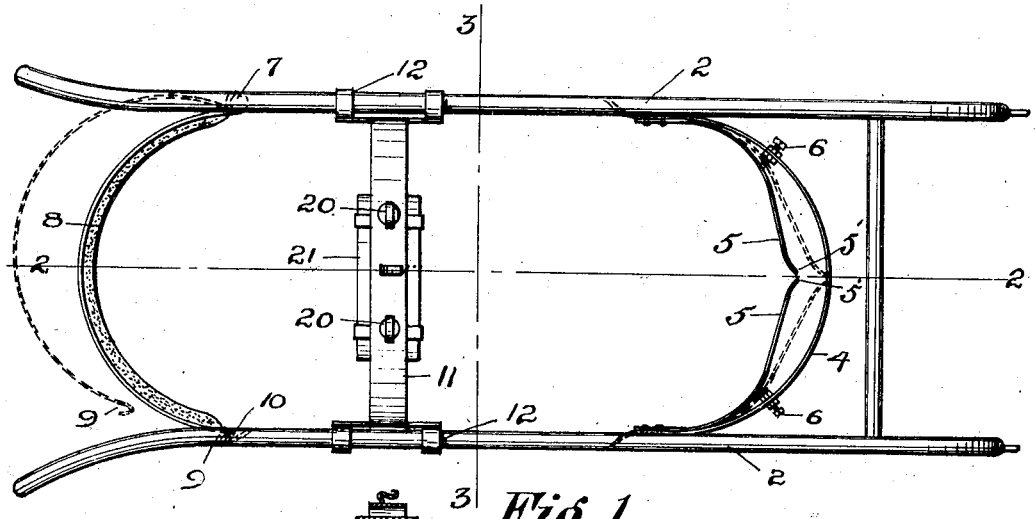
Figure 2:
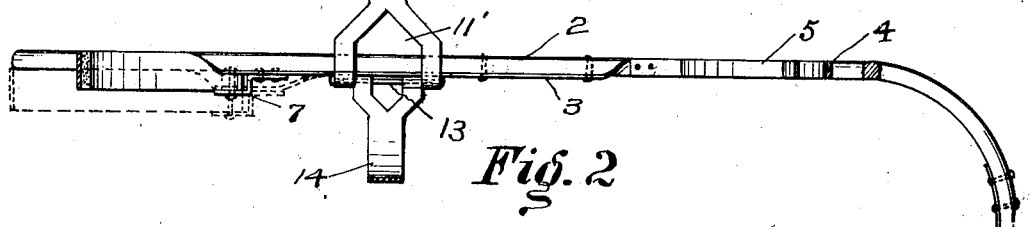
Figures 3, 4, 5:
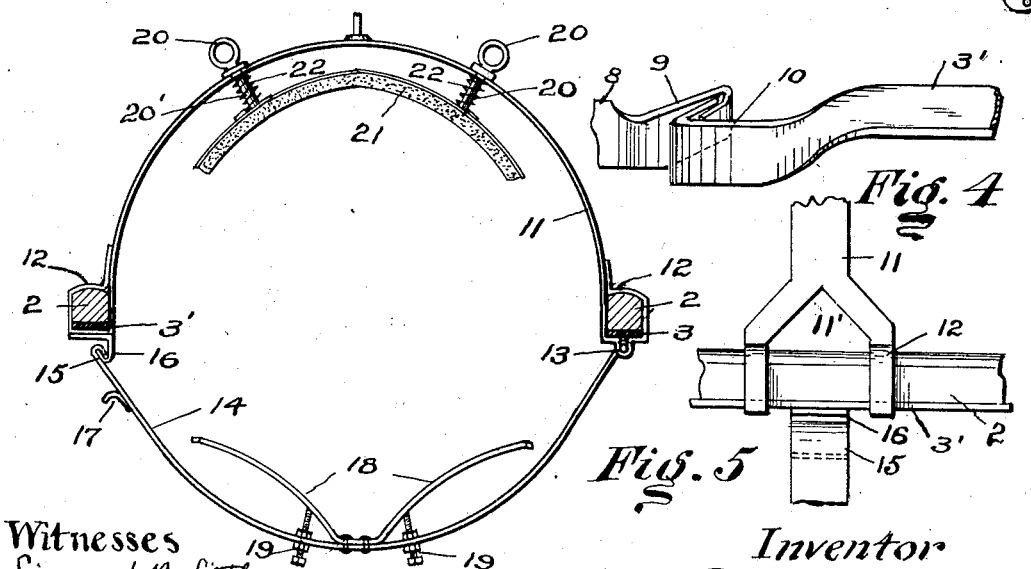

Figure 1 is a top plan view of harness and vehicle-shafts embodying the invention, and Fig. 2 is a longitudinal sectional view taken on line 2 2 of Fig. 1. Fig. 3 is a cross-sectional view on line 3 3 of Fig. 1. Figs. 4 and 5 are detail views.

Referring to the drawings, 2 designates the shafts, and 3 and 3' are flat metal straps secured, respectively, to the under sides of the shafts. Said straps are preferably formed of a single piece of metal, being connected at the rear by the curved cross portion 4, which constitutes the harness-breeching. This breeching member being of metal, and hence quite stiff, I secure to opposite sides of the inner face thereof the leaf-springs 5, which are adapted to yield when the horse is holding back, the free ends 5' of the springs cooperating at such time with breeching 4, as indicated in dotted lines, Fig. 1. Screws 6 serve to adjust the tension of said springs.

Hinged at 7 to the forward end of shaft-strap 3 is the forwardly-curved metallic breast-collar 8, formed at its free end with hook 9 to engage hook 10, formed at the forward extremity of shaft-strap 3'. This forms a secure fastening for the breast-collar and one which may be readily detached for unhitching the horse. I prefer to have the collar extend upward between the shafts when in use, as shown in Fig. 2, and in order that the same may swing outward or open, as in dotted lines in Fig. 1, the forward portion of strap 3 is not secured to the shaft, and hence is free to spring downward, as in dotted lines, Fig. 2, so that the collar may turn outward, as described.

The harness-saddle 11 is formed of metal, with its extremities bifurcated at 11' and looped around the shafts at 12 and permanently secured thereto, the forked saddle ends providing a braced connection with the shafts, which is very desirable. While the breast-collar connects with the shaft-straps 3 and 3', yet the draft is directly on the shafts, and with a heavy load they would tend to spring inward and bind the horse were it not for saddle 11, which is sufficiently heavy to remain substantially rigid in its upwardly-bowed position, thereby bracing the shafts and preventing them from springing in the manner described. Connecting loops 12 at one side of the harness is pin 13, and mounted to swing thereon is the curved metal belly-band 14, having hook 15 at its free end, which unites with hook 16, depending from the opposite shaft, thus providing a convenient detachable connection, a finger-hold 17 being provided for conveniently connecting and disconnecting the band. Leaf-springs 18, having tension-adjusting screws 19, are mounted on the belly-band for engaging the body of the horse and holding the band with the required tightness.

20 represents the turrets, having stems 20' movable through apertures in saddle 11, and secured to their inner ends is the saddle-pad 21, springs 22 being arranged on the stems between the saddle and pad for holding the same projected inward.

With the breast-collar and belly-band disengaged in the manner described the horse may be placed in position between the shafts, and as the breeching is already in place all that is necessary to complete the hitching is to attach the belly-band and breast-collar.

With the several parts of the harness formed of metal they retain the desired shape regardless of the presence or absence of the horse and are always in position for use, so that a hitching may be very hurriedly effected. At the same time the construction is most substantial and durable. While I prefer to connect the breeching and breast-collar and reinforce the shafts by extending forward the breeching-forming strap, I do not confine myself thereto, and obviously the construction may be changed in various ways without departing from the spirit of the invention.

I claim as my invention—

1. The combination of a pair of shafts, draft means uniting with the forward ends thereof, and a substantially rigid saddle member carried by the shafts rearward from their forward ends and adapted to brace the shafts against the contracting tendency occasioned by the pull of the draft means.

2. The combination of a pair of shafts, metallic straps extending longitudinally of the shafts and secured thereto, a breeching member connecting the rear ends of the shafts, and a collar member constructed and arranged to unite with the forward ends of the straps.

3. The combination with vehicle-shafts, of a breast-collar connected at its ends to the shafts, and a substantially rigid harness-saddle connecting and bracing the shafts.

In testimony whereof I affix my signature in presence of two witnesses.

BLAKE A. DUNKLE.

Witnesses:
JOHN J. WALKER,
J. M. NESBIT.